United States Patent [19]
Sakai et al.

[11] Patent Number: 4,913,566
[45] Date of Patent: Apr. 3, 1990

[54] SPELL CHECK DEVICE WITH DISPLAY

[75] Inventors: Toshiyuki Sakai, Nagoya; Yoshio Sugiura, Nishikamo; Satoshi Furukawa, Suzuka, all of Japan

[73] Assignee: Brother Kobyo Kabushiki Kaisha, Aichi, Japan

[21] Appl. No.: 142,190

[22] Filed: Jan. 6, 1988

[30] Foreign Application Priority Data

Jan. 7, 1987 [JP] Japan .................................... 62-2077
Mar. 23, 1987 [JP] Japan .................................. 62-69717

[51] Int. Cl.⁴ ............................................. B41J 5/30
[52] U.S. Cl. ...................................... 400/63; 400/83; 400/696
[58] Field of Search ...................... 400/61, 63, 74, 83, 400/695, 696, 697, 697.1, 9

[56] References Cited

U.S. PATENT DOCUMENTS

| 3,780,846 | 12/1973 | Kolpek et al. | 400/697.1 |
| 4,225,249 | 9/1980 | Kettler et al. | 400/9 |
| 4,240,075 | 12/1980 | Bringol | 400/63 |
| 4,674,065 | 6/1987 | Lange | 400/63 |
| 4,730,269 | 3/1988 | Kucera | 400/63 |

FOREIGN PATENT DOCUMENTS

0164874  7/1986  Japan ............................... 400/697.1

Primary Examiner—David A. Wiecking
Assistant Examiner—Steven S. Kelley
Attorney, Agent, or Firm—Kane, Dalsimer, Sullivan, Kurucz, Levy, Eisele and Richard

[57] ABSTRACT

Disclosed is a typing device wherein relational data such as correct spelling word may substitute the printed word. When the printed data is substituted by the relational data, the succeeding printed data posterior to said printed data to be substituted is visually represented on a display.

5 Claims, 10 Drawing Sheets

```
MISSPEL: AAB; TEXT: ABC DEFG HIJK LMN_
SUGGEST: AAAA BBBB CCC DDDDD. EEEE
```
                                                    75

FIG. 7(b)

```
MISSPEL: AAB, TEXT: ABC DEFG HIJK LMN_
SUGGEST: BBBB CCC DDDDD EEEE AAAA
```
                                                    75

FIG. 7(c)

```
MISSPEL: AAB, TEXT: ABC DEFG HIJK LMN_
SUGGEST: EEEE AAAA BBBB CCC DDDDD
```
                                                    75

FIG. 7(d)

```
RST UVW XYZ AAB.↑
            Ho
```

FIG. 7(e)

```
RST UVW XYZ AAAA, ABC DEFG HIJK LMN↑
                                  Ho
```

SPELL CHECK DEVICE WITH DISPLAY

BACKGROUND OF THE INVENTION

This invention relates to a typing device.

Generally the conventional typing device such as electronic typewriter is so designed that, with selection of a spelling check mode during the operation in a typewriter mode, each input word entered from a keyboard can be checked with regard to its spelling while being printed.

And upon detection of any misspelled word in such known device, a warning signal is generated from a buzzer, alarm lamp or the like to an operator.

In such a case, the operator erases the entirety or several characters of the misspelled word by depressing a character erase key and then prints the word again with a correct spelling.

And when the device has a function to display a candidate word relative to the misspelled word, a desired word of a correct spelling can be printed properly on the basis of such candidate word.

In the known electronic typewriter or the like with the above-mentioned spelling check function, a buzzer or similar device is driven upon detection of any misspelled word during a spelling check process in a printing operation, thereby emitting a warning signal to the operator.

However, if the operator is well skilled and fast in manipulation of keys, there may occur a case where several words are printed before the moment such warning signal is heard. And there may also exist the possibility that the operator fails to hear the warning signal completely and therefore continues printing without correction of the misspelled word.

If the number of characters of the properly spelled word (correct word) is less than or equal to that of the misspelled word, the misprinted characters of the latter word can be erased and reprinted with correction.

However, in case the number of characters of the correct word is far greater than that of the misspelled word, it is impossible to print the correct word in place of the misspelled word, so that the entire words posterior to the misspelled word need to be erased for reprint, hence complicating the manipulation for correction of the print with another problem of inducing deterioration in the operational efficiency.

SUMMARY OF THE INVENTION

It is therefore an object of the invention to provide an improved typing device wherein, when the printed data is substituted by the relational data, the succeeding printed data posterior to said printed data to be substituted is all represented on a display, thereby ensuring enhanced convenience in manipulation.

Another object of the invention is to provide an improved typing device with a spelling check function which selects a display mode after print of any misspelled word and visually represents subsequent input data without printing the same, thereby facilitating correction of the misspelled word.

According to one aspect of the invention, there is provided a typing device comprises: input means for inputting data of characters and/or symbols; print means for printing the input data on a print medium; printed data memory means for storing the printed data in relation to the print position thereof; relational data memory means for storing relational data adapted to substitute the printed data; designate means for designating one of said printed data; retrieval means for retrieving the relational data in said relational data memory means corresponding to the printed data designated by said designate means; and control means for controlling said display means so as to visually represent the succeeding printed data posterior to the printed data designated by said designate means in accordance with the data stored in said printed data memory means.

According to another aspect of the invention, there is provided a typing device comprising input means for inputting data of characters and/or symbols; display means for visually representing the input data; print means for printing the input data on a print medium; control means for controlling said display means and print means with selection of either a print mode for enabling said print means to print the input data or a display mode for enabling said display means to visually represent the input data, the data input through said input mean being successively printed on said print medium under said print mode while the data being successively represented on said display means under said display mode; dictionary memory means for storing spelling information of a multiplicity of words; spelling check means for checking the spelling of each input word by retrieving the relational word data in said dictionary memory means; and mode changeover means for switching said control means to a display mode in response to detection of any misspelled word by said spelling check means during the operation in print mode.

DESCRIPTION OF THE PREFERRED EMBODIMENTS

Figure 1:
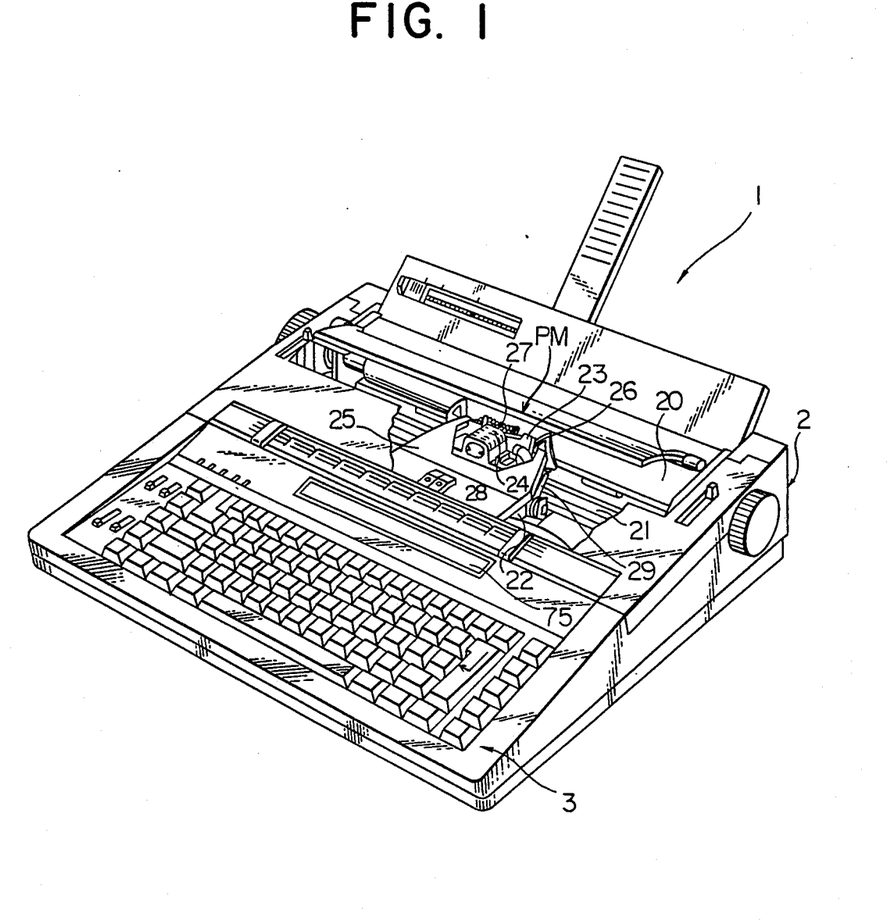
FIG. 1 is a perspective view of an electronic typewriter embodying the invention.

FIG. 1 shows an electronic typewriter embodying the invention, wherein a keyboard 3 is disposed in a front portion of a body frame 2 of the typewriter 1, and a print mechanism PM is incorporated in the frame 2 behind the keyboard 3. A liquid crystal display 75 is disposed in a rear portion of the keyboard 3 for visually representing input characters and symbols with a capacity of 2 lines and 40 digits.

The keyboard 3 is furnished with character keys 10 including alphabet keys, numeral keys and symbol keys, and also with various functions keys as in any ordinary typewriter. In addition, the keyboard 3 further has a space key 11, a cursor shift key 12, an erase key 13 for erasing printed characters or displayed characters, a retrieval key 14 for retrieving a candidate word relative to a misspelled word and visually representing such candidate word on the display 75, and a print execute key 15 for printing, with selection of a print mode, the candidate word or the display data including such candidate word represented on the display 75 after changeover to a display mode.

The print mechanism PM consists at least of a platen 20 for feeding a print sheet, a motor for actuating the platen, and a platen motor drive circuit; a carriage 22 supported by a guide 21 parallel with the platen 20, a motor for reciprocating the carriage 22 leftward or rightward, and a carriage motor drive circuit; a typewheel 24 housed in a wheel cassette 23, a motor for rotating the type wheel 24, and a wheel motor drive circuit; a print ribbon 26 housed in a ribbon cassette 25, a motor for taking up the print ribbon, and a ribbon motor drive circuit; a print hammer for striking each type element 27 of the type wheel 24, a solenoid 28 for driving the print hammer, and a solenoid drive circuit; and a ribbon changeover mechanism for selectively placing the print ribbon 26 or the correction ribbon 29 at the print position. The print mechanism PM is the same as employed in any ordinary electronic typewriter.

Figure 2:
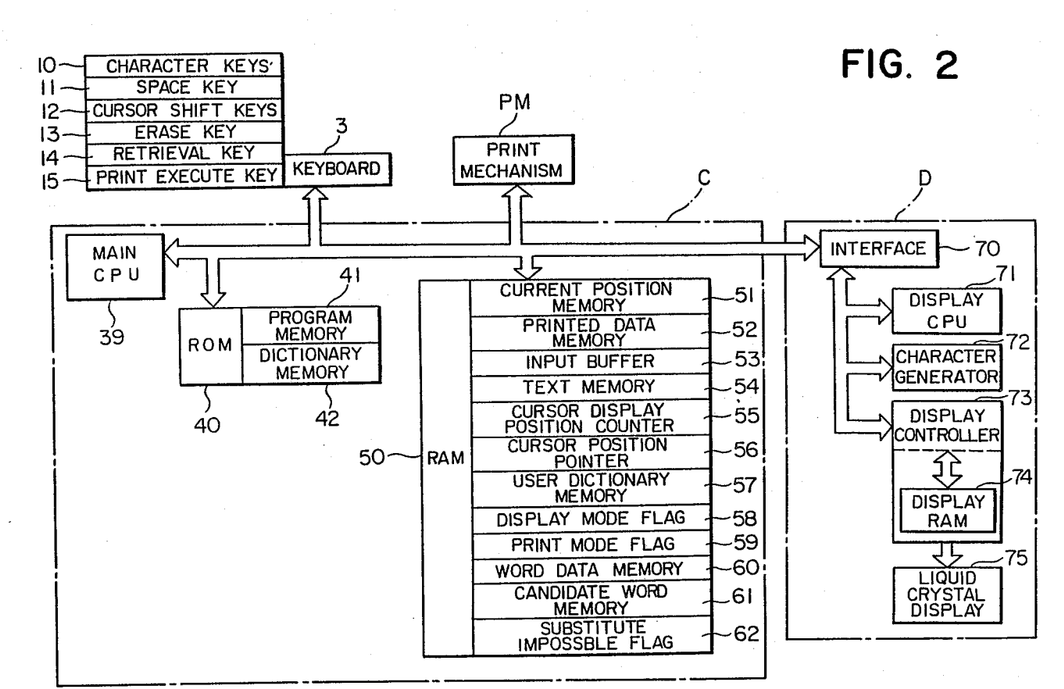
FIG. 2 is a block diagram of a control system in the typewriter.

Now the entire constitution of a control system in the electronic typewriter will be described below with reference to a block diagram of FIG. 2.

Basically the typewriter 1 comprises a keyboard 3, a print mechanism PM, a display mechanism D and a controller C. Out of such components, the keyboard 3 and the print mechanism PM and the display mechanism D are connected to a main CPU (central processing unit) 39 of the controller C via a data bus and so forth.

The controller C comprises a main CPU 39, a ROM (read only memory) 40 and a RAM (random access memory) 50 connected to the main CPU 39 via a data bus and so forth.

In a program memory 41 of the ROM 40, there are stored a control program for controlling the print mechanism PM and the display mechanism D in accordance with code data inputted from the character keys and the function keys of the keyboard 3, a control program for a spelling check process, a control program for retrieval of a candidate word relative to any misspelled word posterior to the spelling check, a control program for erasure of characters, and a program for display control which will be described later.

Meanwhile in a dictionary memory 42 of the ROM 40, data of, e.g. 70,000 words arranged alphabetically as in any ordinary dictionary are stored for checking the spellings of input words and also for retrieving candidate words.

The RAM 50 comprises a current position memory 51 for sequentially renewing and storing, in a print mode (typewriter mode), the current position of the carriage 22 (print head) relative to its absolute original position correspondingly to the print position; a print data memory 52 for sequentially storing, in a print mode, data of about 500 printed characters correspondingly to the print position; an input buffer 53 for storing, in a memory mode (display mode), data of characters and so forth inputted from the keyboard 3 or read out from a text memory 54 and visually represented on the display 75; a text memory 54 for storing, in a memory mode, the entire input data as file data; a cursor display position counter 55 for counting the cursor display position correspondingly to each display position on the display 75 in accordance with the shift of the cursor; a cursor position pointer 56 for indicating the address of the input buffer 53 in accordance with the data of the cursor display position counter 55; a user dictionary memory 57 capable of freely registering and deleting particular words such as proper nouns not stored in the dictionary memory 42; a plurality of memories for temporarily storing the results of computation executed in the main CPU 39; a display mode flag 58 set with selection of a display mode; a print mode flag 59 set with selection of a print mode; a word data memory 60 for storing the latest input word or the cursor-indicated word data to be checked with regard to its spelling; a candidate word memory 61 for storing the entirety of candidate words retrieved by depression of the retrieval key 14; and a substitute impossible flag 62 which is set when it is impossible to print the candidate word in place of the misspelled word.

In the print mode, the main CPU 39 actuates the print mechanism PM in compliance with the control program to print the characters and symbols which correspond to the data inputted from the character keys, and stores the printed data sequentially in the printed data memory 52 correspondingly to the print position. In a line-by-line mode (print mode per line), the main CPU 39 stores the input data of one print line in the input buffer 53 while visually representing such data on the display 75, and further prints the characters and symbols of one line in response to depression of the return key while storing such data in the printed data memory 52.

In a display mode, the main CPU 39 stores the input data of one print line in the input buffer 53 while visually representing such data on the display 75 and further stores the data of one line in the text memory 54 in response to depression of the return key.

The display mechanism D comprises an interface 70, a display CPU 71, a character generator 72, a display controller 73 and a liquid crystal display 75 which are connected as illustrated.

In the character generator 72, there are stored dot matrix display data of about 400 kinds for visually representing characters and symbols on the display 75 in conformity with the code data.

In response to the command data and the character data outputted from the main CPU 39 via the interface 70, the display CPU 71 reads out the corresponding display data from the character generator 72 and outputs the display data to the display controller 73. Then the display controller 73 writes the display data in the display RAM 74 while outputting to the liquid crystal display 75 the display signal corresponding to such display data. Furthermore, in response to the cursor shift data fed from the main CPU 39 via the interface 70, the display CPU 71 executes cursor shift control for instructing the display controller 73 to indicate the address to which the cursor is to be shifted.

Upon depression of the erase key 3 in a print mode, the same type element 27 as the printed character is struck through the correction ribbon 29 in accordance with the data stored in the printed data memory 52, whereby the printed character is erased.

In a spelling check mode, upon depression of any of the word separation keys such as space key 11 or return key (including symbol keys for period, comma, colon, semicolon and so forth) in succession to the character data of an input word, the word having the same spelling as that of the input word is retrieved by collation with the individual words stored in both the dictionary memory 42 and the user dictionary memory 57. And if none of the stored words has the same spelling as that of the input word, the operator is informed of an alarm which indicates a misspelling. And in response to depression of the candidate key 13, retrieval is repeated as to whether any word spelled by substituting the individual characters of the misspelled word by individual characters of the alphabet is existent or not in the dictionary memory 42 and the user dictionary memory 57, or retrieval is executed with substitution of the character row on the basis of the rule that the spelling is prone to be mistaken due to similar pronunciation or the like, and one or more candidate words of proper spellings related to the misspelled word are visually represented on the display 75. Since such spelling check and candidate word retrieval control are the same as those in the conventional apparatus, a detailed explanation thereof is omitted here.

Figure 3A:
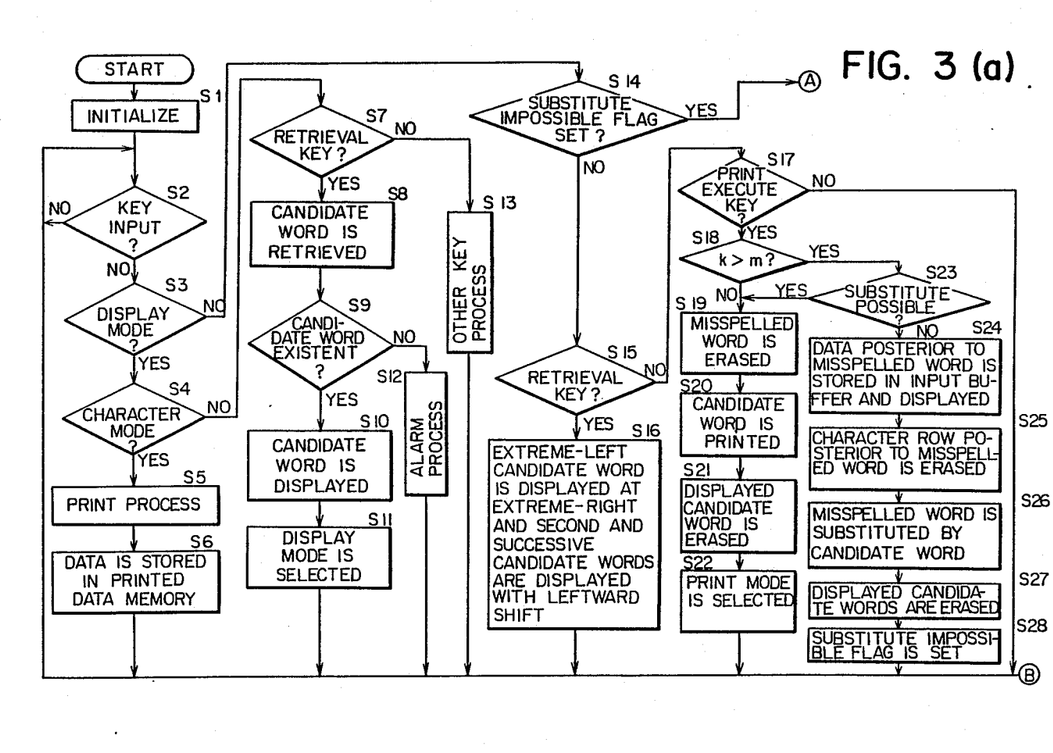
FIG. 3 is a flow chart of routines for display control.
Figure 3B:
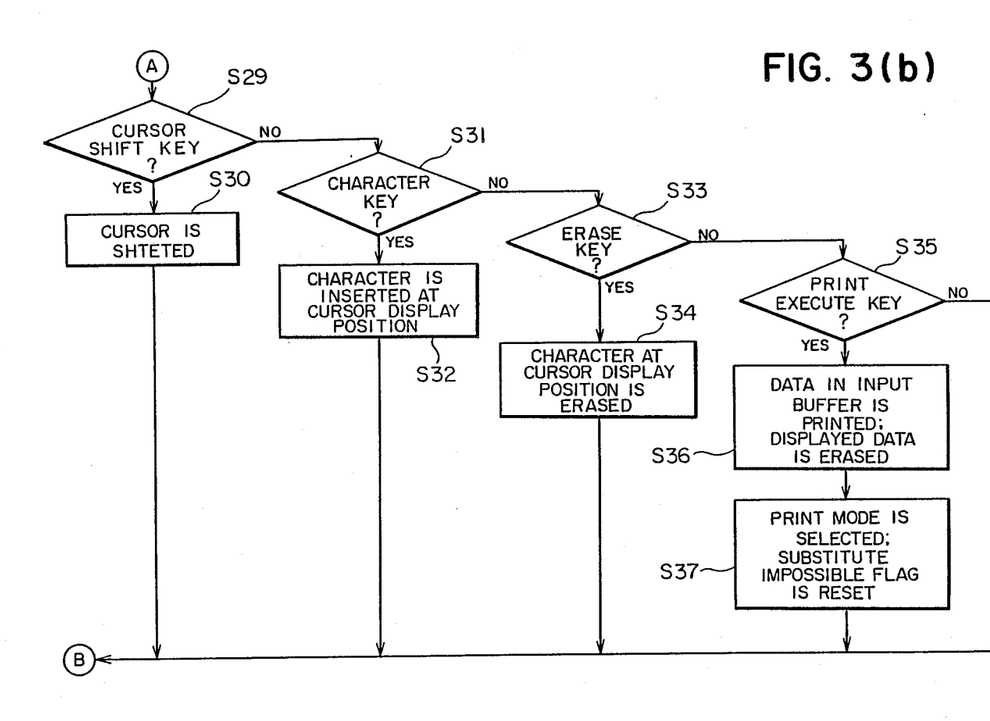

Now a description will be given on the display control, which is executed by the controller C of the electronic typewriter, with reference to flow charts of FIG. 3 (a) and (b).

The spelling check for each of the input words is executed in compliance with the spelling check control program other than the display control program.

When power is supplied to the typewriter, such control is started with its procedure advancing to step S1 (hereinafter referred to simply as S1, and other steps mentioned similarly) for initialization of selecting a typewriter mode (print mode), setting a print mode flag 59 and resetting a display mode flag 58. And next in S2, a key input is waited.

Upon depression of any key, a decision is made in S3 as to whether the display mode is selected or not (whether the display mode flag 58 is set or not) from the data of the display mode flag 58. And if the result of such decision is not the display mode but the print mode, the procedure advances to S4 for deciding whether the key input is from any character key 10 or not. In the case of the character key 10, the procedure advances to S5 where the character corresponding to the input character data is printed. In this stage, the main CPU 39 outputs a control signal to each drive circuit of the print mechanism PM. And next in S6, the printed data is stored in both the printed data memory 52 and the word data memory 60, while the data in the current position memory 51 is renewed. Subsequently the procedure returns to S2.

Figure 4:
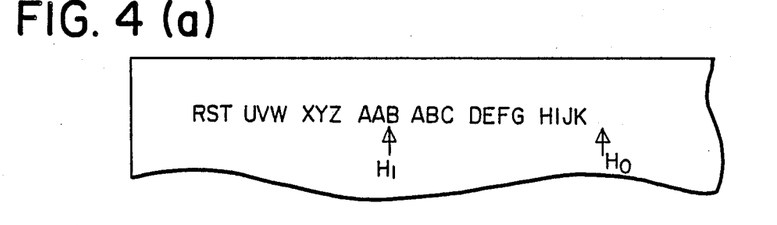
FIGS. 4(a) through 4(h) illustrate exemplary visual representation and piint in substituting a misspelled word by a candidate word.

And the processes in S2 through S6 are repeatedly executed so that, as illustrated in FIG. 4 (a) for example, a character row "RTS UVW ... HIJK" is printed (with the print head placed at the position $H_0$). Then the print head is moved to the position $H_1$ corresponding to the misspelled word "AAB" detected by the buzzer, or the print head is moved automatically toward the top of the print line by depression of the find key to detect the misspelled word "AAB" and is thereby brought to the position $H_1$.

In response to depression of the retrieval key 14 for displaying the candidate words, the procedure advances through S2–S4 to S7. And when the result of the decision in S7 becomes Yes, the word data (misspelled word) indicated by the print head is written in the data memory 60 in accordance with the data of both the printed data memory 52 and the current position memory 51. Then the procedure advances to S8.

In S8 where the candidate word retrieval control program is read out, the candidate words relative to the misspelled word are retrieved in accordance with the data of the word data memory 60, the dictionary memory 42 and the user dictionary memory 57, and the entirety of such detected candidate words are stored in the candidate word memory 61. In S9, a decision is made as to whether any candidate word is existent or not from the data of the candidate word memory 61. And in case any candidate word is existent, the control procedure advances to S10.

In S10, the entire candidate words stored in the candidate word memory 61 are visually represented on the display 75. Next in S11 where a display mode is selected, the print mode flag 59 is reset while the display mode flag 58 is set, and then the procedure returns to S2. For example, as illustrated in FIG. 4 (b), candidate words "AAAA","BBBB", "CCCC", "DDDD" and "EEEE" are visually represented in the second line on the display 75.

When no candidate word is existent, the result of the decision in S9 becomes No, so that the procedure advances to S12 for execution of an alarm process to sound a buzzer or the like and then returns to S2.

In case the depressed is an other key than the character keys 10 or the retrieval key 14, the result of the decision in S7 becomes No, so that the procedure advances to S13 for execution of a process corresponding to the depressed key and then returns to S2.

In the above control, the extreme-left one out of the entire candidate words being displayed is printed in place of the misspelled word. Therefore, when the retrieval key 14 is depressed for shifting the display position of such candidate word, the procedure advances through S2 and S3 to S14 for deciding whether the substitute impossible flag 62 is set or not. And in case the flag 62 is not set, the procedure further advances to S15.

As the result of the decision in S15 becomes Yes, the procedure advances to S16 where the extreme-left candidate word on the display 75 is represented at the extreme right while the second and successive candidate words are displayed with leftward shift, and then the procedure returns to S2. For example, as illustrated in FIG. 4 (c), a candidate word "BBBB" is displayed at the extreme left and a candidate word "AAAA" at the extreme right respectively.

The processes in S2, S3, S14 and S16 are repeated to display a desired candidate word at the extreme left. And when the print execute key 15 is depressed for printing such candidate word in place of the misspelled word, the procedure advances through S2, S3, S14 and S15 to S17. Since the result of its decision becomes Yes, the procedure further advances to S18.

In S18, a decision is made as to whether the number k of characters of the candidate word is greater or not than the number m of characters of the misspelled word in accordance with the extreme-left candidate word data being represented on the display 75 and also with the data in the word data memory 60. And if the number k is smaller than or equal to the number m, the procedure advances to S19.

The misspelled word indicated by the print head is erased in S19, and subsequently the candidate word represented at the extreme left on the display 75 is printed in S20. Next in S21, the entire candidate words being represented on the display 75 are erased while the candidate word memory 61 is cleared. And in S22 where a print mode is selected, the display mode flag 58 is reset while the print mode flag 59 is set. And then the procedure returns to S2.

If the result of the decision in S18 becomes Yes signifying that the number k of characters is greater than the number m, the procedure advances to S23. In this step, a decision is made as to whether substitute print is possible or not from the data including the numbers k and m of characters, the print pitch currently selected and another print pitch smaller than that. In case such substitute print is possible, the processes in S19 and successive steps are executed, and the candidate word is printed at the renewed pitch. For example, as illustrated in FIG. 4 (d), a candidate word "AAAA" is printed at a pinch smaller than the current pitch. The visual representation of the candidate words in this step is based on FIG. 4 (b). When the result of the decision in S23 is No signifying that the candidate word cannot be printed within the space of the misspelled word, the procedure advances to S24. In this step, the data posterior to the misspelled word is written in the input buffer 53 while being visually represented on the display 75 in accordance with the data of both the printed data memory 52 and the current position memory 51. Next in S25, the character row posterior to the misspelled word is erased, and the printed data corresponding to such erased character row is cleared in the printed data memory 52. For example, as illustrated in FIG. 4 (a) and 4 (e) the words posterior to the misspelled word indicated by the print head (position $H_1$) are erased.

Figure 4E:
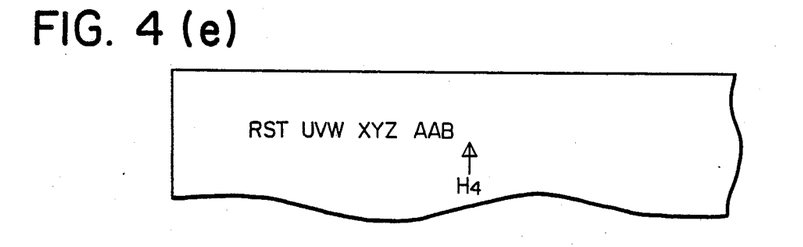
Figure 4F:
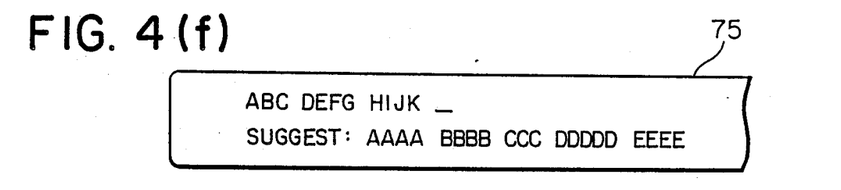

Next in S26, the misspelled word is erased in accordance with the data of the word data memory 60 and is substituted by the candidate word. For example, as illustrated in FIG. 4 (e) and 4 (f), the missplled word "AAB" is erased and substituted by the extreme-left candidate word "AAAA" in the second line on the display 75.

Figure 4G:
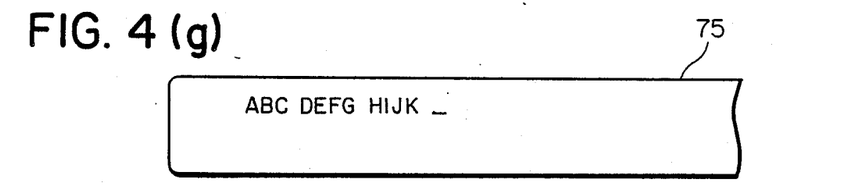

Subsequently in S27, the entire candidate words represented on the display 75 are erased while the candidate word memory 61 is cleared. And after the substitute impossible flag 62 is set in S28, the procedure returns to S2. (See FIG. 4 (g))

Also when the result of the decision in S17 is No, the procedure returns to S2.

Upon depression of the cursor shift key 12 in this stage to correct the data being represented on the display 75, the procedure advances from S2, S3 and S14 to S29 (FIG. 4 (b)). When the result of its decision becomes Yes, the procedure further advances to S30 for shifting the cursor leftward or rightward and then returns to S2. In this stage, the data in both the cursor display position counter 55 and the counter position pointer 56 are renewed.

In response to depression of any character key 10, the procedure advances from S29 to S31. When the result of its decision becomes Yes, the procedure further advances to S32 where, in accordance with the data of the cursor position pointer 56, the character data is inserted at the address in the input buffer 53 indicated by the cursor position pointer 56 and is simultaneously represented in an inserted state on the liquid crystal display 75. Then the procedure returns to S2.

Upon depression of the erase key 13, the procedure advances through S29 and S31 to S33. When the result of its decision becomes Yes, the procedure further advances to S34 where the character data at the address in the input buffer 53 indicated by the cursor position pointer 56 is erased in accordance with the data of the cursor position pointer 56, and simultaneously the character at the cursor display position on the liquid crystal display 75 is also erased. Then the procedure returns to S2.

Figure 4H:
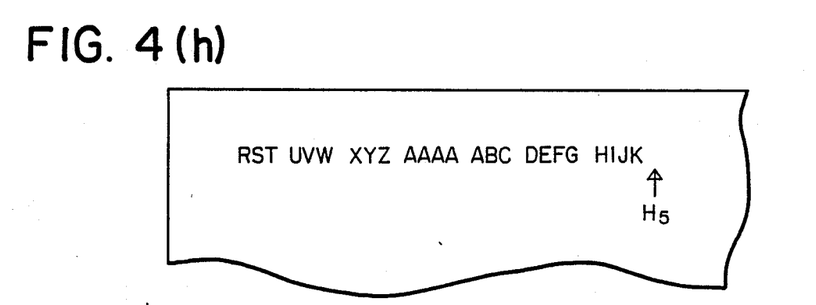

In response to depression of the print execute key 15 after completion of the correction, the procedure advances through S29, S31 and S33 to S35. When the result of its decision becomes Yes, the procedure further advances to S36 where the entire data of the input buffer 53 is printed, and the printed data is written in the printed data memory 52 while the data being represented on the display 75 is erased. For example, as illustrated in FIG. 4 (e), (g) and (h), the data posterior to the candidate word is printed.

Next in S37 where a print mode is selected, the display mode flag 58 is reset while the print mode flag 59 is set, and further the substitute impossible flag 62 is reset. Then the procedure returns to S2.

As described hereinabove, when the candidate word is to be printed for correction to substitute the misspelled word after the character row is printed in succession to the misspelled word, if such corrective print is impossible due to the situation that the number of characters of the candidate word is greater than that of the misspelled word, the character row posterior to the misspelled word is visually represented on the display 75 and then is erased, so that substitution of the misspelled word by the candidate word can be attained with ease, and yet it is not necessary to reinput the character row posterior to the candidate word, hence facilitating the manipulation for correction of the printed data and enhancing the operational efficiency.

The exemplary embodiment mentioned is so contrived that the dictionary memory 42 storing a plurality of words therein is provided to serve as a relational data memory, and candidate words relational (corresponding) to the misspelled word indicated by the print head are visually represented on the display 75. However, the present invention is applicable also to such a typing device that synonyms, conjugations and similar words relational to the input data are stored in the dictionary memory 42 to substitute the input data, wherein the synonyms, conjugations or similar words corresponding to the word indicated by the print head may be visually represented on the display 75.

Figure 5:
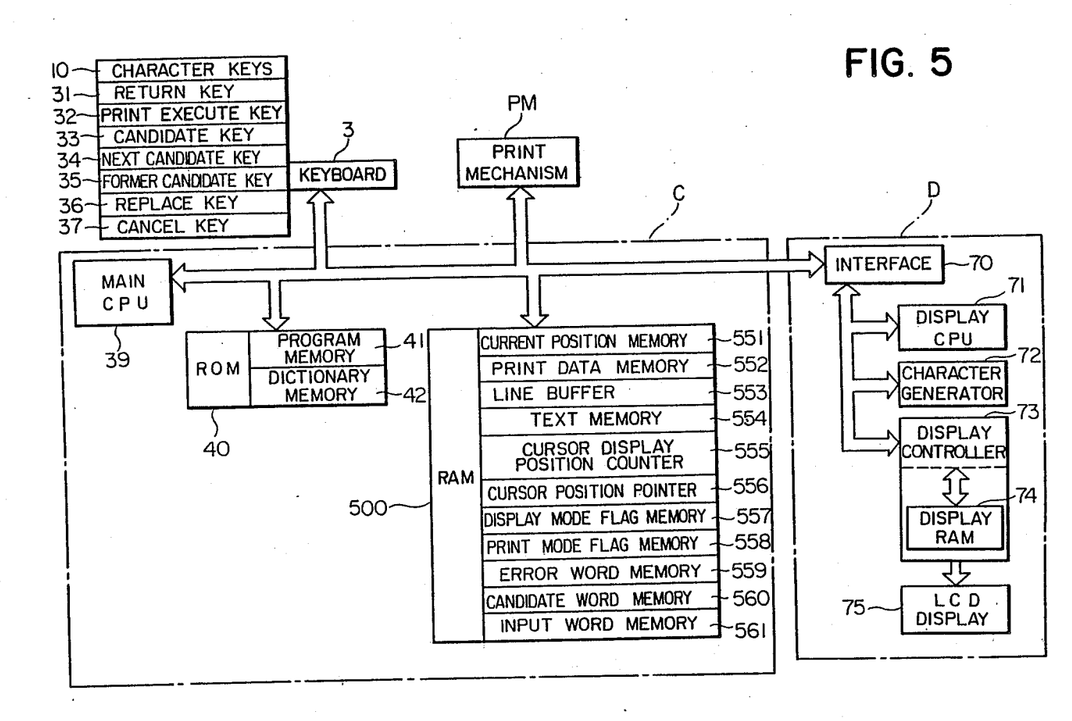
FIG. 5 is a block diagram of a control system in another electronic typewriter embodying the invention.

FIG. 5 is a block diagram showing a modified constitution of the electronic typewriter embodying the invention. In this modification, the keyboard 3 is furnished with a print execute key 32 for printing, with selection of a print mode, the entire data represented on the display 75 after changeover to a display mode; a candidate key 33 for visually representing a candidate word on the display 75 with regard to the latest-printed missplled word; a next candidate key 34 and a former candidate key 35 for changing the display order of the candidate words visually represented; a replace key 36 for erasing the misspelled word, then replacing it with a candidate word and printing the latter; and a cancel key 37 for clearing the input data and the candidate word data represented on the display 75 with selection of a display mode.

Further, the RAM 500 comprises a current position memory 551 for sequentially renewing and storing, in a typewriter mode, the current position of the carriage 22 (print head) relative to its absolute original position correspondingly to the print position; a print data memory 552 for sequentially storing, in a typewriter mode, data of about 500 printed characters correspondingly to the print position; a line buffer 553 for storing, in a memory mode, data of characters and so forth inputted from the keyboard 3 or read out from a text memory 554 and visually represented on the display 75; a text memory 554 for storing, in a memory mode, the entire input data as file data; a cursor display position counter 555 for counting the cursor display position correspondingly to each display position on the display 75 in accordance with the shift of the cursor; a cursor position pointer 556 for indicating the address of the line buffer 553 in accordance with the data of the cursor display position counter 555; a plurality of memories for temporarily storing the results of conputation executed in the main CPU 39; a display mode flag memory 557 for storing a display mode flag which is set in response to selection of a display mode; a print mode flag memory 558 for storing a print mode flag which is set in response to selection of a print mode; an error word memory 559 for storing a misspelled word and separation data in response to a decision of misspelling as a result of the spelling check; a candidate word memory 560 for storing the entire candidate words retrieved by depression of the candidate key 33, and an input word memory 561 for storing the data of the latest input word.

The display mode is set for temporarily displaying the input data. And upon selection of the display mode, the input data is stored in the line buffer 553 but not in the text memory 554.

In the typewriter mode, the main CPU 39 actuates the print mechanism PM in compliance with the control program to print the characters and symbols which correspond to the data inputted from the character keys, and stores the print data sequentially in the print data memory 552 correspondingly to the print position. In a line-by-line mode the main CPU 39 stores the input data of one print line in the line buffer 553 while visually representing such data on the display 75, and further prints the characters and symbols of one line in response to depression of the return key while storing such data in the print data memory 552.

In a memory mode, the main CPU 39 stores the input data of one print line in the line buffer 553 while visually representing such data on the display 75 and further stores the data of one line in the text memory 554 in response to depression of the return key.

Upon depression of the character erase key, the same type element 27 as the printed character is struck through the correction ribbon 29 in accordance with the data stored in the print data memory 552, whereby the printed character is erased.

In a spelling check mode, upon depression of any of the word separation keys such as space key or return key (including symbol keys for period, comma, colon, semicolon and so forth) in succession to the character data of an input word, the word having the same spelling as that of the input word is retrieved by collation with the individual words stored in the dictionary memory 42. And if none of the stored words has the same spelling as that of the input word, the operator is informed of an alarm which indicates a misspelling. And in response to depression of the candidate key 33, retrieval is repeated as to whether any word spelled by replacing the individual characters of the misspelled word with individual characters of the alphabet is existent or not in the dictionary memory 42, or retrieval is executed with replacement of the character row on the basis of the rule that the spelling is prone to be mistaken due to similar pronunciation or the like, and one or more candidate words of proper spelling related to the misspelled word are visually represented on the display 75. Since such spelling check and candidate word retrieval control are the same as those in the conventional device, a detailed explanation thereof is omitted here.

Figure 6:
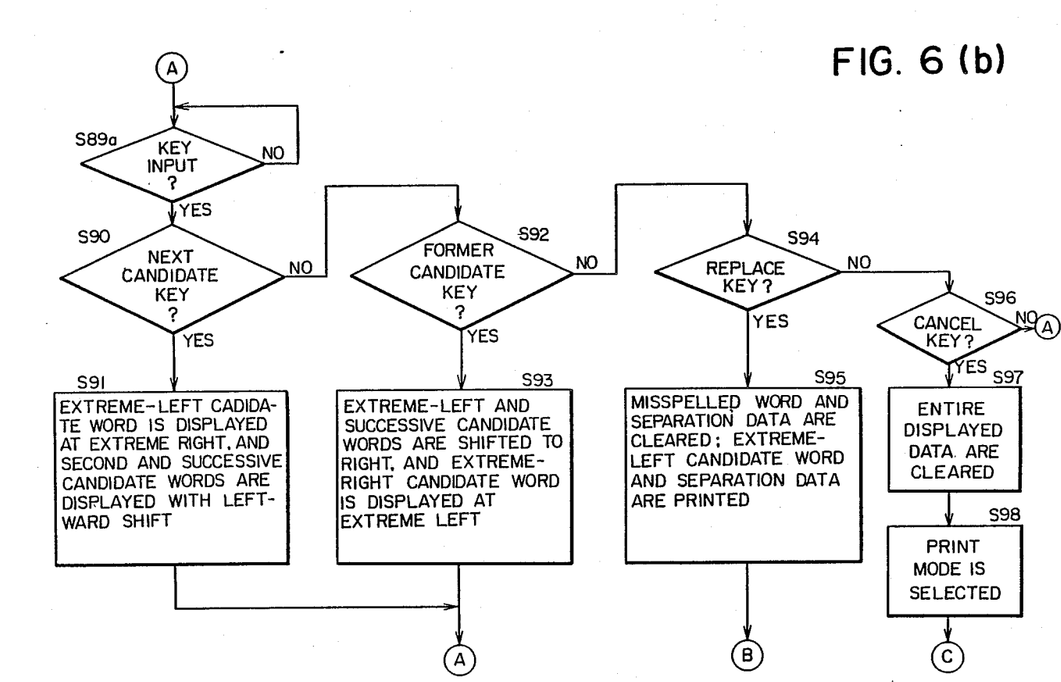
FIGS. 6(a) and 6(b) show a flow chart of routines for mode selection control.
Figure 6A:
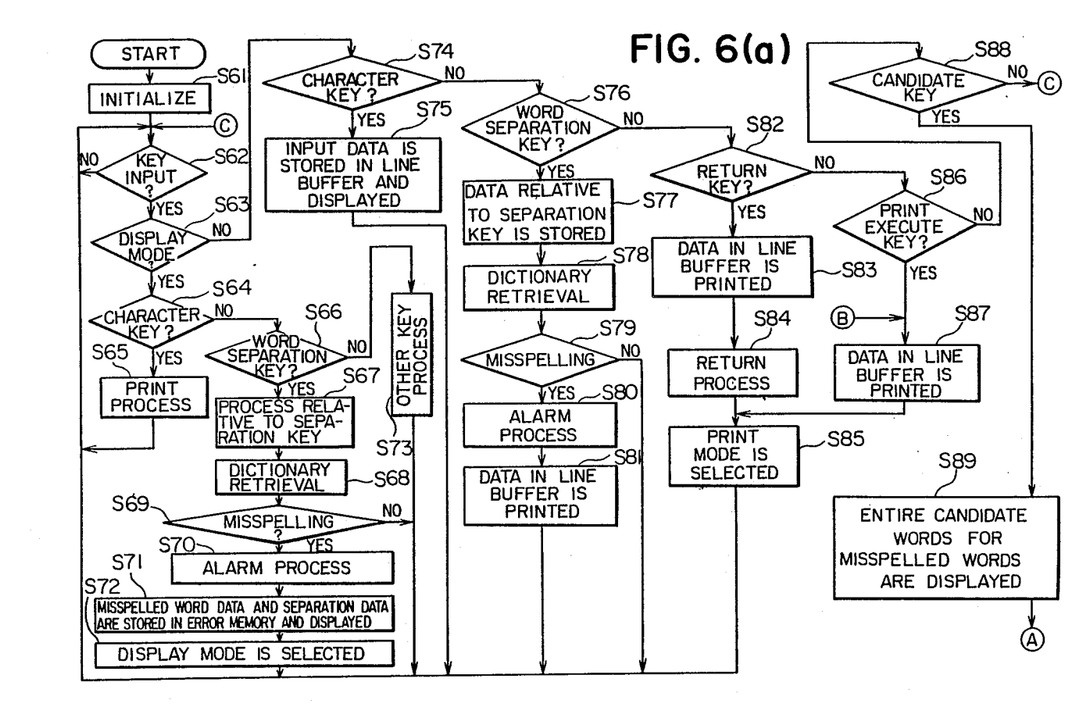

Now a description will be given on the mode changeover control, which is executed by the controller of the electronic typewriter, with reference to flow charts of FIGS. 6 (a) and 6 (b).

When power is supplied to the typewriter, such control is started with its procedure advancing to step S61 (hereinafter referred to simply as S61, and other steps mentioned similarly) for initialization of selecting a typewriter mode (print mode), setting a print mode flag and resetting a display mode flag. And next in S62, a key input is waited.

Upon depression of any key, a decision is made in S63 as to whether the display mode is selected or not (whether the display mode flag is set or not) from the data of the display mode flag memory 557. And if the result of such decision is not the display mode but the print mode, the procedure advances to S64 for deciding whether the key input is from any character key 10 or not. In the case of the character key 10, the procedure advances to S65 for printing the character data and then returns to S62.

In this stage, the main CPU 39 outputs a control signal to each drive circuit of the print mechanism PM.

In case the depressed key is not any of the character keys 10, the procedure advances from S64 to S 66 for deciding whether the depressed key is any of the word separation keys (space key, return key, symbol keys for period, comma, colon and so forth). And if the result is Yes, the data of the latest input word is stored in the input word memory 561, and then the procedure advances to S67 for execution of the process corresponding to the depressed separation key.

Next in S68, dictionary retrieval is executed in accordance with the data of both the input word memory 561 and the dictionary memory 42. And subsequently the procedure advances to S69 for deciding whether the input word is misspelled or not, i.e. whether any word of the same spelling as that of the word stored in the input word memory 561 is existent or not in the dictionary memory 42. And if the result of such decision is Yes, the procedure advances to S70.

Figure 7A:
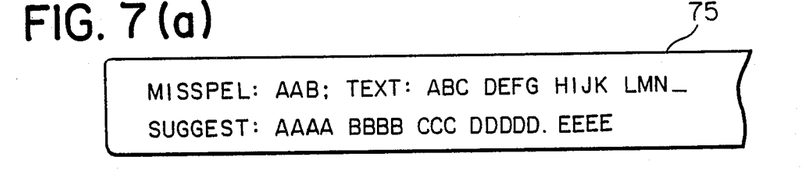
FIGS. 7(a) through 7(e) illustrate exemplary visual representation of input data and candidate words subsequent to selection of a display mode.

After sounding a buzzer or lighting up and alarm lamp to execute an alarm process in S70, the procedure advances to S71, where the data of the input word memory 561 or the data of the misspelled word and the separation data corresponding to the depressed separation key decided in S66 are stored in the error word memory 559 while being visually represented on the display 75. For example, as illustrated in FIG. 7 (a), a misspelled word "AAB" and separation data "," (comma) are represented in succession to an item "MISSPEL". Next in S72, a display mode flag is set with selection of a display mode while a print mode flag is reset, and then the procedure returns to S 82.

In case the result of the decision in S69 is No, the procedure returns to S62. Meanwhile if the result in S66 is No, the procedure advances to S73 for execution of the process corresponding to the depressed function key and then returns to S62.

In this stage, the carriage 22 (print head Ho) is placed, for example, at the next print position of separation character "," which is posterior to the misspelled word "AAB" as illustrated in FIG. 7 (d).

Upon depression of any key, the procedure advances through S62 and S63 to S74 for deciding whether the depressed key is one of the character keys 10 or not. And in the case of the character key 10, the procedure advances to S75 for storing the input data in the line buffer 553 while visually representing the same data on the display 75.

The processes in S62, S63, S74 and S75 are repeatedly executed so that the input character row is sequentially stored in the line buffer 553 while being visually represented on the display 75.

And when any separation key is depressed, the procedure advances through S62, S63 and S74 to S76, where the result of its decision becomes Yes and the data of the latest input word is stored in the input word data memory 561. Subsequently the procedure advances to S67.

Next in S68, dictionary retrieval is executed on the basis of the data in both the input word data memory 561 and the dictionary memory 42. Then the procedure advances to S79 for deciding whether the input word is misspelled or not. And if the result of such decision is No, the procedure returns to S62. The processes in S62, S63 and S74 through S79 are repeatedly executed so that, for example, words "ABC", "DEFG", "HIJK" and "LMN" are visually represented in succession to an item "TEXT" on the display 75 as illustrated in FIG. 7 (a).

If the input word is decided to be misspelled in S79, the procedure advances from S79 to S80 for execution of an alarm process and then further advances to S81 for printing the entire data of the line buffer 553. Subsequently the procedure returns to S62.

For example, the words "ABC", "DEFG" and so forth illustrated in FIG. 7 (a) are printed from the position of the print head (Ho) shown in FIG. 7 (d).

When the return key 31 is depressed, the procedure advances through S62, S63, S74 and S76 to S82, where the result of its decision becomes Yes. Then the procedure further advances to S83 for printing the entire data of the line buffer 553. Next in S84, a return process is executed for moving the carriage 22 to a left margin position and feeding the print sheet by the line. Subsequently the procedure advances to S85 for selecting a print mode to consequently set a print mode flag while resetting a display mode flag, and then returns to S62.

If the print execute key 32 is depressed for selecting the print mode while canceling the display mode, the procedure advances through S62, S63, S74, S76 and S82 to S86 where the result of its decision becomes Yes, so that the procedure further advances to S87 for printing the entire data of the line buffer 553. And after the print mode is selected in S85, the procedure returns to S62.

When the candidate key 33 is depressed in this stage to display candidate words for the misspelled word "AAB" after inputting the words "ABC"... "LMN" as illustrated in FIGS. 7 (a) through 7 (d), the procedure advances through S62, S63, S76, S82 and S86 to S88.

Since the result of the decision in S88 becomes Yes, the procedure advances to S89 where candidate words for the misspelled word are retrieved in compliance with the candidate word retrieval control program and also on the basis of the data in both the input word memory 561 and the dictionary memory 42, and the entire candidate words are stored in the candidate word memory 560 while being visually represented on the display 75, and then the procedure advances to S89a. For example, candidate words "AAAA", "BBBB", "CCCC", "DDDD" and "EEEE" are sequentially represented in the second line on the display 75 as illustrated in FIG. 7 (a).

In case the result of the decision in S88 becomes No, the procedure returns to S62.

Figure 7B:
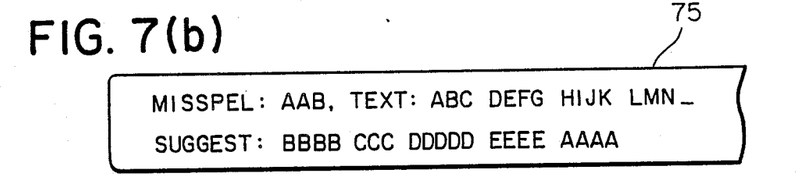

A key input is waited in S89a. And in response to any key input, the procedure advances to S90. When the key input is from the next candidate key 34, the result of the decision in S90 becomes Yes, so that the procedure further advances to S91 where the candidate word represented at the extreme left on the display 75 is shifted to the extreme right while the second and successive candiate words are shifted to the left, and then the procedure returns to S89a. For example, as illustrated in FIG. 7 (b), the candidate word "BBBB" is represented at the extreme left and the candidate word "AAAA" at the extreme right.

Figure 7C:
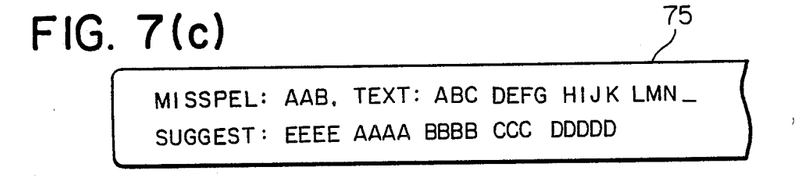
Figure 7D:
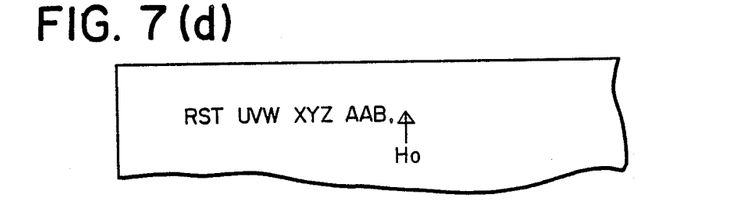

When the former candidate key 35 is depressed, the procedure advances through S89a and S90 to S92 where the result of its decision becomes Yes. Then the procedure further advances to S93 where the candidate words represented at the extreme left and successibe positions on the display 75 are shifted to the right while the candidate word represented at the extreme right is shifted to the extreme left. And subsequently the procedure returns to S89a. For example, as illustrated in FIG. 7 (c), the candidate word "EEEE" is represented at the extreme left and the candidate word "DDDD" at the extreme right respectively.

Figure 7E:
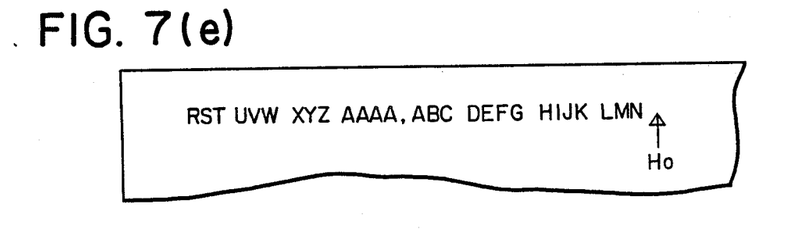

When the replace key 36 is depressed, the procedure advances through S89a, S90 and S92 to S94 where the result of its decision becomes Yes. Then the procedure advances to S95 where the misspelled word and the separation data are erased on the print sheet in accordance with the data of both the error word memory 559 and the current position memory 551, and subsequently the word and the separation data visually represented at the extreme left on the display 75 are printed. Through the processes in S87 and S85, the entire data in the line buffer 553 are printed with simultaneous selection of a print mode, and the procedure returns to S62. For example, as illustrated in FIGS. 7(a) and 7(e), the misspelled word "AAB" and The separation character "," are erased, and instead the candidate word "AAAA" at the extreme left and the separation character "," and the words "ABC" ... "LMN" are printed.

When the cancel key 37 is depressed, the procedure advances through S89a, S90, S92 and S94 to S96, where the result of its decision becomes Yes. Then the procedure further advances to S97 where the date in both the line buffer 553 and the candidate word memory are entirely cleared, so that the data visually represented on the display 75 are also entirely cleared. Then the procedure advances to S98 for selecting a print mode and returns to S62.

In this stage, the misspelledword can be corrected by depressing, for example, the word correct key or the character erase key.

In case the result of the decision in S96 is No, the procedure returns to S89a.

As described hereinabove, when a misspelled word has been printed, the display mode is selected and any subsequent inputword is visually represented on the display 75 without being printed, so that even if the number of characters of a properly spelled word is greater than that of the misspelled word, it becomes possible to correct and reprint the misspelled word with facility, hence simplifying the correction of any misspelled word to eventually enhance the operational efficiency.

What is claimed is:

1. A typing device comprises:
   input means for inputting data of characters and/or symbols;
   display means for visually representing the input data;
   print means for printing the input data on a print medium;
   control means for controlling said display means and print means with selection of either a print mode for enabling said print means to print the input data or a display mode for enabling said display means to visually represent the input data, while disabling said print means the data input through said input means being successively printed on said print medium under said print mode while the data being successively represented on said display means under said display mode;
   dictionary memory means for storing spelling information of a multiplicity of words;
   spelling check means for checking the spelling of each input word by retrieving the relational word data in said dictionary memory means; and
   mode changeover means for switching said control means to a display mode in response to detection of any misspelled word by said spelling check means during the operation in print mode.

2. The device according to claim 1 wherein said control means controls said display means so as to visually represent the relational word data retrieved by said spelling check means.

3. The device according to claim 2 which further comprises select means for selecting one of said relational word data represented on said display means.

4. The device according to claim 3 which further comprises erase means for erasing the printed data, and wherein said control means controls said erase means so as to erase said misspelled word and then controls said print means so as to print the relational word data selected by said select means to substitute said erased misspelled word.

5. The device according to claim 4 wherein said control means controls said print means so a to print the data input after the mode is switched to the display mode from the print mode, after said relational word data is selected and printed.

* * * * *